Feb. 26, 1952 J. J. BISHOP ET AL 2,587,099
RESILIENT HEAD FOR DIAL BORE GAUGES
Filed May 16, 1947

INVENTORS.
John J. Bishop
BY Earl M. Boat
Darly + Darly
ATTORNEYS

Patented Feb. 26, 1952

2,587,099

UNITED STATES PATENT OFFICE 2,587,099

RESILIENT HEAD FOR DIAL BORE GAUGES

John J. Bishop and Earl M. Boat, Poughkeepsie, N. Y., assignors to Standard Gage Company, Inc., Poughkeepsie, N. Y., a corporation of New York Application May 16, 1947, Serial No. 748,400

4 Claims. (Cl. 33—178)

The present invention relates to dial bore gages and particularly to such gages for use in gaging small bores.

More particularly still the invention relates to a means for centering the gage in a bore comprising a raised area immediately surrounding the measuring plunger.

The bore gage of this invention is designed to utilize an ordinary dial indicator gage as the indicating element and is in a sense an attachment for such a gage.

It is an object of the invention to provide a bore gage particularly suited for measuring small bores and having an efficient mode for centering the gage in the bore.

It is another object of the invention to provide a centering means, as mentioned above, which is readily produced and likewise easily and efficiently utilized.

Other objects and features of the invention will appear when the following description is considered in connection with the annexed drawings in which—

Figure 1:
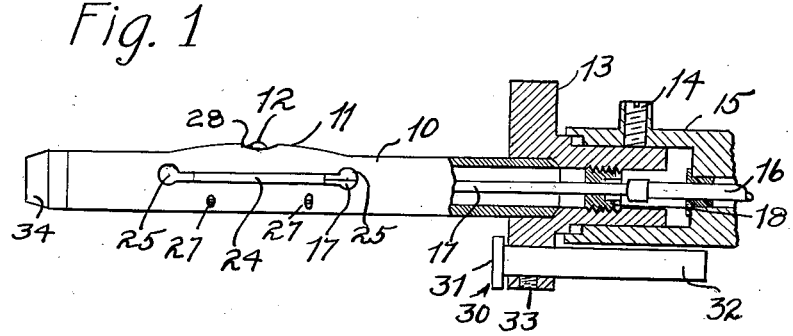
Figure 1 is a side elevation of the gage of my invention, the gage being shown partly in section in order to illustrate the mounting of a dial indicator in the housing to cooperate with the measuring elements of the bore gage proper.
Figure 2:
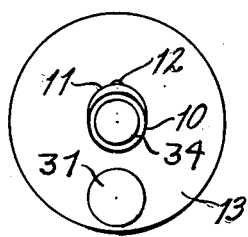
Figure 2 is an end elevation of the gage of Figure 1.
Figure 4:
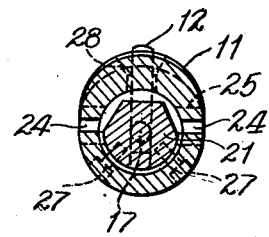
Figure 4 is a vertical cross-sectional view of the bore gage of the other figures, this figure being taken on the plane of the line 4—4 of Figure 3.

Referring now to the drawings the gage of the present invention comprises a tubular member 10 having thereon an elevation 11 surrounding the measuring plunger 12. The tubular member 10 is provided at one end with a housing member 13. Fastened to this housing member 13 by any suitable means as, for example, the set screw 14 is a housing member 15 which supports a dial gage of normal type, not shown. The normal measuring plunger of the dial gage is indicated at 16 and it cooperates with the longitudinal plunger 17 of the bore gage, this plunger being guided for movement by means of the collar 18 screwed into the interior of the housing member 13 as well as by the bearing surface 20 in a block 21 shortly to be described.

The end of the plunger 17 terminates in the angular face 22 which cooperates with the angular faces of the notch 23 in the measuring plunger 12 to thereby transmit movement to the measuring plunger 16 of the dial indicator.

Figure 3:
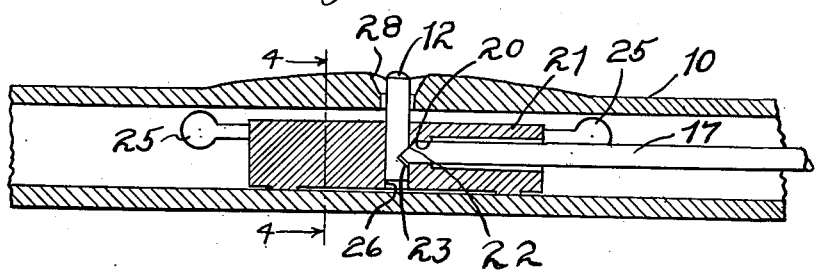
Figure 3 is a fragmentary vertical cross-section of the gage of Figure 1 showing particularly the centering device.

The gage element or tube 10 is provided with slots 24 in its opposite side walls, these slots terminating in the holes 25 as seen particularly in Figures 1 and 3. These slots provide for a considerable flexibility of the raised area 11 and thus provide means for centering the tube 10 in a bore to be measured.

The measuring plunger 12, as has already been described cooperates with the plunger 17 which plunger is moved by the plunger 12. Plunger 12 is guided for reciprocatory movement in a hole 26 in the block 21, block 21 being fixed in position by any suitable means as, for example, the screws 27.

In order to produce the raised area 11, the tube 10 is provided with a block similar to the block 21, which block has a tapped hole immediately beneath the hole 28 through which the plunger 12 projects. The tube 10 is first turned to a desired diameter and wall thickness and the block just mentioned fastened therein. Next a screw is inserted through the hole 28 and into the block mentioned and tightened to an extent such that the portion of the wall above the slot 24 is bent downwardly and into contact with the block. Next the tube is inserted in a grinding machine and ground down. However, this grinding operation is limited so that the central portion of the area 11 is least operated upon by the grindstone and the areas adjacent the ends of the slot are considerably ground down resulting in an increasing thickness of the wall towards the central area of the elevation 11. Upon removing the screw and the temporary block, the tube 10 then assumes the shape shown in Figures 1 and 3, the thicker areas becoming an elevation on the surface of the tube surrounding the location of the measuring plunger 12. Thus by a very simple operation we produce a centering device which is efficient in operation.

As is usual in gages of the type described, there is provided a stop 30 to determine the area of the work which is to be gauged, this stop 30 being provided with a head 31 which engages the work and a shaft 32 which passes through a bore in the housing member 13 and is adjustable axially of the gage by having a set position by means of the set screw 33. The otherwise open end of the tube 10, i. e. the left end as seen in Figure 1, is closed by means of a plug 34 which may be inserted in any suitable manner as, for example, by threading it into the tube 10 or by brazing, welding or otherwise affixing it thereto.

What is claimed is:

1. In a dial bore gage, in combination, a sleeve formed of resilient material, a measuring plunger extending transversely of said sleeve, one end of said plunger projecting through said sleeve, a radially enlarged area on said sleeve surrounding said projecting plunger end, and slots extending longitudinally of said sleeve adjacent said radially enlarged area to partially separate said area from the remainder of said sleeve and increase the resiliency of said area to inward deformation and thereby align the gage in a bore to be measured.

2. In a dial bore gage, in combination, a sleeve formed of resilient material, a measuring plunger extending transversely of said sleeve, one end of said plunger projecting through said sleeve, a radially enlarged area on said sleeve surrounding said projecting plunger end, and a pair of slots in said sleeve, said slots extending longitudinally of said sleeve, being located immediately adjacent said enlarged area, said radially enlarged area being given increased resiliency thereby to thus resiliently resist inward deformation and align the device in a bore to be measured.

3. In a dial bore gage, in combination, a sleeve formed of resilient material, a block mounted in said sleeve, said block having bores therein at right angles to each other, one extending longitudinally of said block and the other transversely thereof and intersecting the first, a measuring plunger in said transverse bore, said plunger projecting through the wall of said sleeve, a radially enlarged area on said sleeve surrounding said projecting end of said plunger, and a pair of slots in said sleeve, said slots extending longitudinally of said sleeve, said radially enlarged area lying above said slots and being given increased resiliency thereby to provide resilient resistance of said radially enlarged area to inward deformation and align the device in a bore to be measured.

4. In a dial bore gage, in combination, a sleeve formed of resilient material, a block mounted in said sleeve, said block having bores therein at right angles to each other, one extending longitudinally of said block and the other transversely thereof and intersecting the first, a measuring plunger in said transverse bore, said plunger projecting through the wall of said sleeve, a radially enlarged area on said sleeve surrounding said projecting end of said plunger, a pair of slots in said sleeve, said slots extending longitudinally of said sleeve, said radially enlarged area being adjacent to said slots and being given increased resiliency thereby to thus increase the resilient resistance of said enlarged area to inward deformation and align the device in a bore to be measured, an intermediate plunger operable by said measuring plunger, and a dial indicator gage mounted on one end of said sleeve, and having its measuring plunger pressed against the end of said intermediate plunger whereby movement of the measuring plunger of the bore gage effects proportional movement of the measuring plunger of said dial indicator.

JOHN J. BISHOP.
EARL M. BOAT.

REFERENCES CITED

The following references are of record in the file of this patent:

UNITED STATES PATENTS

| Number | Name | Date |
| --- | --- | --- |
| 1,660,506 | Hamilton | Feb. 28, 1928 |
| 1,743,116 | Cook | Jan. 14, 1930 |
| 1,845,359 | Stein | Feb. 16, 1932 |
| 2,179,538 | Boehnke | Nov. 14, 1939 |
| 2,269,556 | St. Clair | Jan. 13, 1942 |
| 2,385,157 | Nilsson et al. | Sept. 18, 1945 |
| 2,408,325 | Luce | Sept. 24, 1946 |
| 2,429,511 | Emery | Oct. 21, 1947 |
| 2,443,880 | Aldeborgh | June 22, 1948 |
| 2,480,011 | Fretter | Aug. 23, 1949 |